A. CONNELLY.
Faucet and Bushing.
No. 209,380. Patented Oct. 29, 1878.
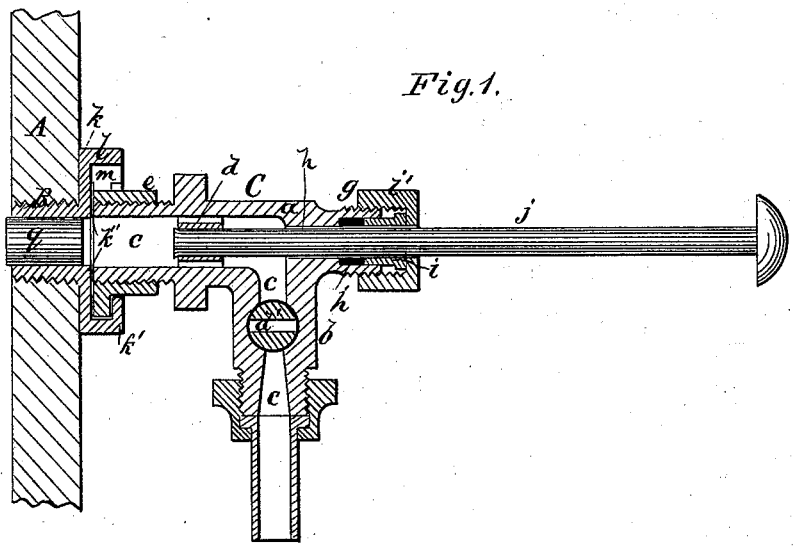
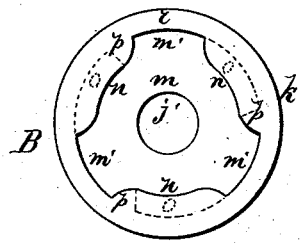
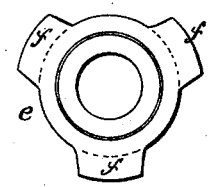
WITNESSES:
Henry N. Miller
C. Sedgwick
INVENTOR:
A. Connelly
BY Munn & Co
ATTORNEYS.

UNITED STATES PATENT OFFICE.

AUSTIN CONNELLY, OF HOBOKEN, ASSIGNOR TO HIMSELF AND JOHN V. SMITH, OF ELIZABETHPORT, NEW JERSEY.

IMPROVEMENT IN FAUCETS AND BUSHINGS.

Specification forming part of Letters Patent No. 209,380, dated October 29, 1878; application filed September 19, 1878.

*To all whom it may concern:*

Be it known that I, AUSTIN CONNELLY, of Hoboken, in the county of Hudson and State of New Jersey, have invented a new and Improved Faucet and Bushing, of which the following is a specification:

This invention relates to improvements in the construction of faucets and bushings for beer and ale barrels, casks, &c., the object of which is to facilitate the tapping thereof.

It consists of a faucet provided with a flanged nut for locking it into a permanent bushing screwed into the head of the cask or barrel, and a piston for removing the plug from the bushing, and other details of construction which will be fully explained below.

In the accompanying drawing, forming part of this specification, Figure 1 is a longitudinal section of my improved faucet and bushing attached to a section of the head of a barrel or cask, with the piston in position to drive out the plug. Fig. 2 is a front view of the flanged head of the bushing, and Fig. 3 is an end view of the nut for locking the faucet to the bushing.

Similar letters of reference indicate corresponding parts in all figures.

Referring to the drawings, A represents the section of a barrel-head. B is the bushing screwed therein, and C is the faucet. The faucet is composed of the head $a$ and right-angular portion $b$, with connecting fluid-way $c$, provided with a strainer, $d$, and cock or valve $d'$. The rear end of the faucet is screw-threaded, and engages a sleeve-nut, $e$, having three flanges, $fff$, on its face. On the opposite end is a projecting portion, $g$, provided with a hole, $h$, and stuffing-box, $h'$, into which enters a follower or gland, $i$, secured by screw-cap nut $i'$. Through this is passed a piston, $j$, into the fluidway $c$, and thence through a hole in the strainer $d$. By means of the stuffing-box gland and screw-cap this piston can be closely and securely packed against the escape of any of the contents of the barrel.

The bushing B is provided with a tap-hole, $j'$, and a double-flanged head, $k\,k'$, connected by a rim or annulus, $l$. The outer head, $k'$, is cut into a trefoil opening, $m$, the projecting parts $m'$ of which extend to the annulus $l$, leaving three flanges, $n\,n\,n$, between, under which are short grooves $o$, extending from the extremity of the projecting parts $m'$ to the stops $p$ on the right under the flanges $n\,n\,n$, as clearly indicated by the dotted lines in Fig. 2.

The operation of my improvement is as follows: The bushing is secured permanently in the head of the cask or barrel, and the tap-hole extending through it is closed by a plug, $q$. When the barrel is to be tapped the flanged nut is placed in the bushing with the projections $f$ in the openings $m'$. It is then turned, and the projections $f$ pass in the grooves $o$ under the flanges $n$ until they rest against the stop $p$. It thus locks itself on; and to make a tight connection between the faucet and bushing, the faucet is screwed up into the nut $e$ until its end bears against the face of the head $k$, and is packed by the intervening packing-ring $k''$, care being taken that the adjustment be such that the part $b$ will project downward when the faucet is screwed up as far as it will go. When thus placed the piston $j$ is driven in until it drives out the plug $q$ and taps the barrel, whereupon it is drawn out into the position it occupies in the drawing. To remove the faucet from the bushing the operation is reversed with the exception of the driving of the piston.

Having thus described my invention, I claim as new and desire to secure by Letters Patent—

1. As an improvement in bushings, the bushing B, adapted to be screwed into the barrel-head, and provided with the tap-hole $j'$, heads $k\,k'$, trefoil opening $m$, flanges $n$, and grooves $o$, to receive and hold the end of the faucet to tap and draw the contents of the barrel, substantially as described.

2. As an improvement in faucets, the cap-nut $e$, with flanges $f$, to lock it into the bushing B, in combination with the piston $j$, substantially as described.

3. As an improvement in faucets, the faucet E, provided with the piston $j$, and cap-nut $e$ provided with the flanges $f$, in combination with the bushing B, having tap-holes $j'$, and devices for locking the nut $e$ thereto, substantially as described.

AUSTIN CONNELLY.

Witnesses:
 C. SEDGWICK,
 W. C. DONN.